B. J. MINNIER.
AIR BRAKE APPARATUS.
APPLICATION FILED JUNE 9, 1910.
1,017,787.
Patented Feb. 20, 1912.
2 SHEETS—SHEET 1.
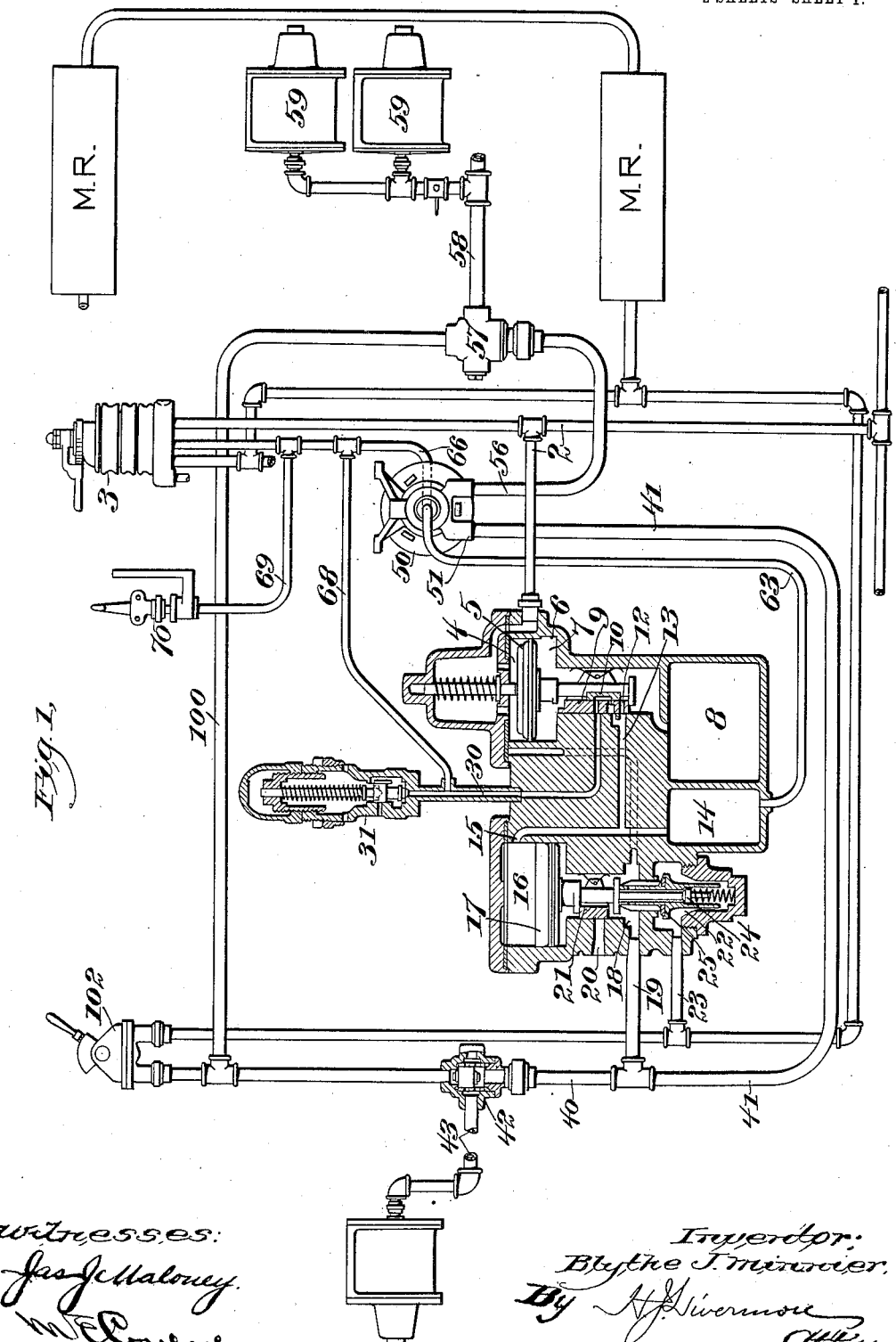

B. J. MINNIER.
AIR BRAKE APPARATUS.
APPLICATION FILED JUNE 9, 1910.
1,017,787.
Patented Feb. 20, 1912.
2 SHEETS—SHEET 2.
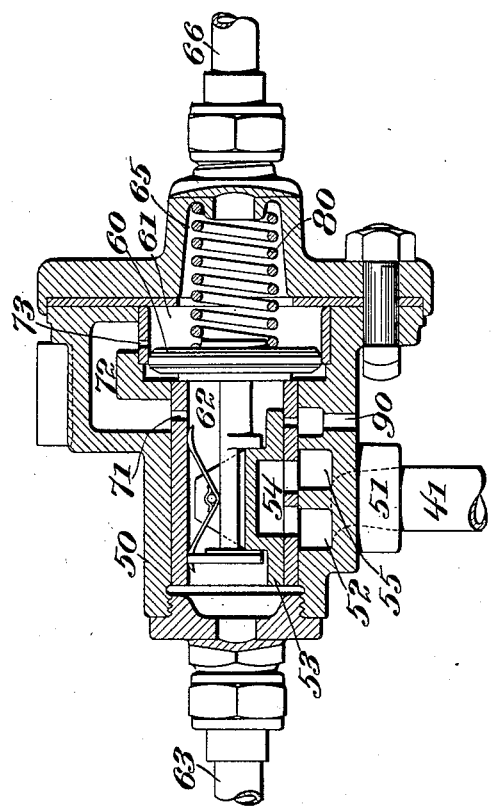
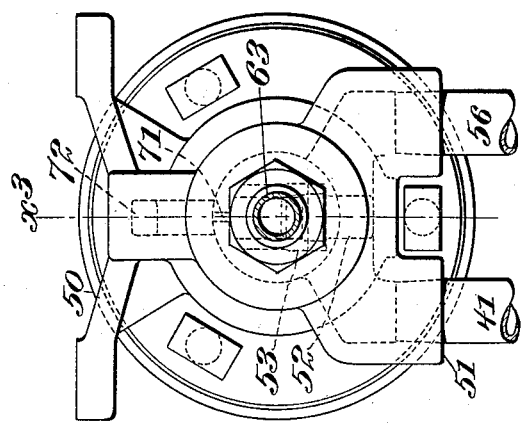

UNITED STATES PATENT OFFICE.

BLYTHE J. MINNIER, OF WATERTOWN, NEW YORK, ASSIGNOR TO NEW YORK AIR BRAKE COMPANY, A CORPORATION OF NEW JERSEY.

AIR-BRAKE APPARATUS.

1,017,787.  Specification of Letters Patent.  Patented Feb. 20, 1912.

Application filed June 9, 1910. Serial No. 565,958.

*To all whom it may concern:*

Be it known that I, BLYTHE J. MINNIER, a citizen of the United States, residing in Watertown, in the county of Jefferson and State of New York, have invented an Improvement in Air-Brake Apparatus, of which the following description, in connection with the accompanying drawings, is a specification, like letters on the drawings representing like parts.

This invention relates to an air brake apparatus, and especially to a device herein called an automatic release valve, the purpose of which is to control the locomotive driver brakes independently of the other brakes, as will be hereinafter described.

The automatic release valve, to which this invention especially relates, is employed in connection with an equipment known as an automatic control equipment wherein a portion of the brakes, as, for example, those pertaining to the locomotive and tender are controlled in conjunction with, but independently of the brakes on the remainder of the train which may be of the well known kind commonly known as the automatic air brake system wherein the brakes are applied by pressure contained in auxiliary reservoirs on the cars and controlled by pressure in the train pipe under control of the engineer by the engineer's brake valve. In such automatic control equipment, the special equipment pertaining to the locomotive and tender is governed by an automatic control valve itself operated by variations in train pipe pressure substantially like the triple valve of the well known automatic air brake apparatus, but operating to admit air directly from the main reservoir to the brake cylinders of the special equipment, instead of from auxiliary reservoirs pertaining to each equipment.

The construction of the automatic control valve is such that in operating the engineer's brake valve to release the brakes on the train, the brakes of the special equipment may be retained applied or may be released at the same time as the other or "regular" brakes, as they will be called, or at any time thereafter, the placing of the engineer's brake valve in release position causing the regular brakes to be released and the remaining or special brakes to remain applied, while the placing of said engineer's brake valve in running position causes both the regular brakes and the brakes of the special equipment to be released, and if the brake valve is first put into release position to release the regular brakes, it may thereafter at any time be put to running position to release the brakes of the special equipment.

The relation of the brakes of the special equipment to the remainder of the system is also such that they may be operated on the straight air plan by air admitted direct from the main reservoir to the brake cylinders under control of a straight air engineer's valve, this straight air or independent mode of operation of the special equipment being practically independent of the automatic equipment, except that the same main reservoir or source of compressed air is used.

The object of the automatic release valve forming the subject of the present invention is to provide for the independent release and control of a portion of the brakes of the special equipments above referred to, viz., the locomotive driving wheel brakes, since, in handling trains on long, heavy grades, it is frequently necessary or advisable to release the brakes on the driving wheels to permit the latter to cool, while the train brakes remain applied. In performing this operation in connection with an automatic control equipment, it is desirable that the driving wheel brakes of the special equipment may thus be released, while the remaining brakes of the special equipment, represented by those on the tender, remain applied, in order to assist in holding the train, and the automatic release valve hereinafter described enables the driver brakes thus to be released independently of the regular brakes and also of the remaining special brakes, for example, those on the tender, but also insures that if, subsequent to such release of the driving wheel brakes, it is desired to increase the braking force on the regular brakes, or in case an emergency application of the brakes should be called for, the braking pressure would be automatically applied to said driving wheel brakes in conjunction with the application, or increase in pressure of the remaining brakes of the train.

Figure 1 is a diagram showing a sufficient portion of an air brake equipment for an understanding of this invention; Fig. 2 is an end elevation; and Fig. 3 is a longitudinal section on line $x^3$, Fig. 2, of the automatic release valve forming the subject of this invention.

Referring to Fig. 1, the automatic control valve is shown conventionally in the position occupied in making a service application of the brakes, the operation of said control valve in admitting air from the main reservoir to apply the special brakes on the locomotive and tender being as follows: The train pipe 2, the pressure in which, derived from the main reservoir M. R., is controlled by the engineer's brake valve 3 in the usual manner, communicates with the chamber 4 in which train pipe pressure acts upon the piston 5, similar to the usual triple valve piston, which, when in release position (at the lower end of its cylindrical chamber, shown in the diagram) permits air to feed through the groove 6 into the valve chamber 7 and auxiliary reservoir 8 communicating therewith, charging the latter to train pipe pressure as in the well known automatic system. The piston 5 operates a main slide valve 9 and graduating valve 10 similar in their relation to one another to the service and graduating valves of the usual triple valve, but in the service position for application of the brakes produced by reducing train pipe pressure so that the pressure in the auxiliary reservoir 8 preponderates and moves the piston 5 upward, the air from the auxiliary reservoir 8, instead of passing directly to the brake cylinder, as in the case of a triple valve of a regular equipment, passes through the port 12 in the main valve 9 to the passage 13 leading to the control reservoir 14 which communicates by passage 15 with the chamber 16 above the piston 17, tending to force the said piston downward to the position shown in the diagram.

The space or chamber 18 below the piston 17 communicates with the pipe 19 leading to the brake cylinders of the special equipment, so that when pressure is admitted to the chamber 18 it passes therefrom to apply the said brakes, and the said chamber below the piston 17 is provided with an exhaust port 20 leading to the atmosphere and governed by the valve 21 which is closed when said piston 17 is in the position shown, or slightly above that position, but is opened when the said piston is moved to the top of the chamber or cylinder 16.

Below the chamber 18 and separated therefrom by a valve controlled passage is a chamber 22 connected by pipe 23 with the main reservoir, and when the piston 17 is forced downward by preponderance of pressure in the cylinder 16 above it, and in the control reservoir 14, it opens the valve 24 or the valve 25 which permits the pressure to pass from the main reservoir and chamber 22 into the chamber 18, and thence through pipe 19 to the brakes of the special equipment to cause the latter to be applied.

As the pressure in the chamber 18 and brake cylinders of the special equipment rises by admission of air from the main reservoir, it will finally slightly overbalance the pressure on the upper side of the piston 17, causing it to rise slightly, and thus causing the valve 24, 25 to close so that no further pressure will be admitted to the brakes of the special equipment, the pressure in which will be approximately equal to that in the control reservoir 14, which, in turn, is determined by the original reduction in train pipe pressure in the engineer's valve in the train pipe 2, and the reduction of pressure in the auxiliary reservoir 8 (by passage of air therefrom through 12 and 13, into the control reservoir 14) to approximate equality with the reduced train pipe pressure produced by the engineer. In this service position of the piston 5, while air is being discharged from the auxiliary reservoir 8, the main and graduating valves 9, 10, connect the passage 13 leading to the control reservoir with the passage 30 leading to the relief valve 31, so that the pressure in the control reservoir 14 and chamber 16 cannot exceed the amount for which the relief valve 31 is set.

When the pressure in the reservoir 8 falls slightly below the train pipe pressure above the piston 5, the latter will be caused to move downward slightly, which will shift the graduating valve 10, so as to close communication between the ports 13 and 30, without, however, changing the position of the main valve 9. This position, resulting when the auxiliary reservoir pressure is slightly below train pipe pressure, is called the service lap position; and the position shown in the diagram, in which auxiliary reservoir pressure is slightly greater than train pipe pressure, but is being reduced by flow into the control reservoir 14, is called the service position.

By the appliances thus far described, air from the main reservoir connection at 23 is admitted to the passage 19 leading to the special equipment, and said passage 19 has branches 40, 41, the former leading to the double check valve 42, and thence by passage 43 to those brake cylinders of the special equipment that do not require to be independently released, which may be exemplified by the equipments on the wheels of the locomotive tender. The branch 41 leads to the automatic release valve 50 with which it connects at 51, the said connection communicating with a port 52 in the valve seat, of the said automatic release valve, on which the valve proper 53 operates. The said valve 53 is of the usual D valve type having a cavity 54 which, in the normal position of said valve shown in Fig. 3, connects the port 52 connected with the pipe 41 with the port 55 connected with pipe 56 leading to the double check valve 57 connected by pipe 58 with the cylinders of the driving brakes. Thus, when the valve 53 of the automatic release valve is in the normal position shown, the air admitted from the automatic control valve to pipe 19 passes equally by pipe 40 to the brakes of the tender, and by pipe 41, release valve 50 and pipes 56, 58 to the driving wheel brake cylinders 59. The said slide valve 53 of the automatic release valve is connected with a piston 60 working in a cylindrical chamber 61 and having the valve chamber 62 at one side thereof connected by passage 63 with the control reservoir 14, so that the pressure at the left hand side of the piston 60 is the same as that in the control reservoir.

The chamber 65 at the right hand side of the piston 60 communicates by passage 66 with the engineer's brake valve which is adapted to control the said passage 66 in such manner that when the engineer's brake valve is in lap position, as when the brakes are applied, the said passage 66 is closed, so that the pressure cannot escape from the chamber 65 therethrough, but when the engineer's valve is in emergency position, air is fed from the main reservoir therethrough into said passage 66 for a purpose which will be explained later. The said passage 66 also communicates by a pipe 68 with the passage 30 of the automatic control valve, and thus is in communication through passage 13 and the valves 9 and 10 with the control reservoir 14 when the piston 5 is in service position, but has that communication cut off when the said piston is in service lap position.

The operation of the control valve is as follows: In the regular application of the brakes, the pressure admitted through the pipe 19 by the automatic control valve of the special equipment passes by branch 40 to the tender brakes, and by branch 41 to the automatic release valve 50 which, at this time, connects the ports 52, 55 and thus permits the air to pass to pipes 56 and 58 and to the driver brake cylinders 59. At this time the pressure from the control reservoir 14 passes by connection 63 into the chamber 62 of the automatic release valve, and thence by passages 71, 72, 73 to the other side of the piston 60 and into the chamber 65 which, at this time, has no open outlet, so that the pressure rises therein substantially as fast as in the chamber 62, and the piston 60 thus remains held by spring 80 in normal position with the valve 53 connecting the ports 52, 55. If it is desired to release the driving wheel brakes without at the same time releasing the other brakes, pressure is allowed to escape from the chamber 65 by the lever release valve 70 connected by branch pipe 69 with the pipe 66, by which the pressure in the chamber 65 may be reduced more rapidly than it can enter through the small passages 71, 73 around the piston 60, which thus becomes subjected to preponderance of pressure on its left hand side which causes it to move toward the right against the force of the spring 80, such movement almost immediately closing the passage 73 and thus leaving the preponderance of pressure in the chamber 62 over that in the chamber 65 after the valve 70 is closed. This movement of the piston 60 shifts the valve 53 so that it closes the port 52 and its cavity 54 connects the port 55 with the port 90 leading to the atmosphere, and thus permits the driver brake cylinders to be exhausted through the passages 58, 56, 55, 54, 90, while the remainder of the special equipment brakes connected with the branch pipe 40 and the brakes of the regular equipment remain unaffected. If, after the driver brakes have been thus released, the braking pressure on the remainder of the brakes is increased in the usual way by reducing the train pipe pressure, this will cause the piston 5 of the automatic control valve to move again from lap to service position which will place the control reservoir 14 in communication with the passage 30 leading to the relief valve 31 and also with the passage 68 communicating with the chamber 65 of the automatic release valve, so that pressure from the control reservoir 14 will also be admitted to act upon the right hand side of the piston 60 and this pressure, in conjunction with that of the spring 80, will move the piston back to the normal position shown, cutting off the driver brake cylinders from the exhaust, and again connecting them with the passage 41 by which pressure is supplied from the main reservoir through the control valve to set the driver brakes again proportionately to the braking force of the remaining brakes of the regular and special equipments.

If, after the driver brakes have been independently released, as has been described, there should be occasion for an emergency application of the brakes, the operation of the engineer's brake valve to effect the emergency application would admit pressure from the main reservoir through passage 66 in the chamber 65, which would immediately cause the piston 60 to be restored to normal position, and also would cause air to feed from the main reservoir through passages 73, 72, 71, into the chamber 62, and thence by communication 63 into the control reservoir 14, thus insuring the maintenance of the desired pressure in that chamber to secure the full application of the brakes.

After the driver brakes have been released, as above described, they will remain released, provided an additional service application of the brakes is not made unless the pressure in the control reservoir 14 should be depleted to a point insufficient to overcome the force of the spring 80, in which event the said spring will return the piston 60 to normal position and automatically cut in the driver brakes, or establish the communication from the driver brake cylinders to the passage 19 by which pressure is applied thereto under control of the automatic control valve.

The double check valves 42 and 57 are interposed respectively between the passages supplying the tender brakes and driving wheel brakes, as above described, and a passage 100 which may be controlled by a straight-air engineer's valve 102 in the usual way to admit air directly from the main reservoir into said pipe 100, and thence to the tender and driving brake cylinders, or to exhaust it therefrom. When the air thus admitted by the straight air brake valve exceeds in pressure the air coming from the pipes 40, 56, the check valves will cut off communication from the latter, and conversely when the pressure in the pipes 40, 56 is greater than that in the pipe 100, as is normally the case when the straight air is not being used, the check valves 42, 57 will cut off communication with said pipe 100. Thus, the straight air may be used in connection with the brakes of a special equipment entirely independently of the operation of the regular and special equipments under control of the engineer's brake valve 3 of the automatic system.

Claims.

1. In an air brake apparatus comprising a main reservoir and train pipe, and a special equipment controlled by train pipe pressure, but having its brakes applied by air pressure from the main reservoir, an automatic release valve comprising a valve proper which in normal position establishes communication to a portion of the brake cylinders of the special equipment that are to be independently released, and in release position cuts off said communication and connects said brake cylinders with an exhaust passage; an actuating piston for said valve; means for yieldingly impelling the same to normal position, said piston being normally subjected at both sides to fluid pressure while the brakes are applied; and means for relieving the pressure at one side of said piston to cause it to move the valve to the exhaust position; and means for automatically applying pressure at that side of said piston to move the valve to normal position when a further application of the brakes is made.

2. The combination with the engineer's valve and automatic control valve of an air brake apparatus; of an automatic release valve comprising a valve proper which in normal position establishes communication between the driving brake cylinders and a source of fluid pressure, and in release position cuts off said communication and places said brake cylinders in communication with an exhaust passage; an actuating piston for said valve, and a spring yieldingly pressing said valve toward the normal position; a communication at one side of said piston to a source of fluid pressure acting while the brakes are applied; a relatively small communication from one to the other side of said piston when in normal position adapted to be cut off when the piston is moved from normal position; and means for releasing the pressure at the opposite side of said piston from that communicating with the above mentioned source of fluid pressure; and means for automatically re-introducing fluid pressure at that side of the piston while an application of the brakes is being made.

In testimony whereof, I have signed my name to this specification in the presence of two subscribing witnesses.

BLYTHE J. MINNIER.

Witnesses:
 JNO. G. CARLIN,
 J. C. CATTINGILL.

---

Copies of this patent may be obtained for five cents each, by addressing the "Commissioner of Patents, Washington, D. C."